No. 732,404.　　　　　　　　　　　　　　PATENTED JUNE 30, 1903.
R. FOSTER.
ROTARY ENGINE.
APPLICATION FILED JAN. 4, 1902.

NO MODEL.　　　　　　　　　　　　　　　　4 SHEETS—SHEET 1.

No. 732,404. PATENTED JUNE 30, 1903.
R. FOSTER.
ROTARY ENGINE.
APPLICATION FILED JAN. 4, 1902.
NO MODEL. 4 SHEETS—SHEET 2.

WITNESSES
B. H. Bucher
Harry Knobloch per

INVENTOR
Richard Foster
O D Levis
ATTORNEY

No. 732,404. PATENTED JUNE 30, 1903.
R. FOSTER.
ROTARY ENGINE.
APPLICATION FILED JAN. 4, 1902.
NO MODEL. 4 SHEETS—SHEET 3.

WITNESSES
B. H. Bucher
Harry Knobloch

INVENTOR
Richard Foster
per
O. D. Lewis
ATTORNEY

No. 732,404. PATENTED JUNE 30, 1903.
R. FOSTER.
ROTARY ENGINE.
APPLICATION FILED JAN. 4, 1902.
NO MODEL. 4 SHEETS—SHEET 4.

WITNESSES
B. H. Bucher
Harry Knobloch

INVENTOR
Richard Foster
per O. D. Lewis
ATTORNEY

No. 732,404. Patented June 30, 1903.

UNITED STATES PATENT OFFICE.

RICHARD FOSTER, OF NEWCASTLE, PENNSYLVANIA.

ROTARY ENGINE.

SPECIFICATION forming part of Letters Patent No. 732,404, dated June 30, 1903.

Application filed January 4, 1902. Serial No. 88,369. (No model.)

*To all whom it may concern:*

Be it known that I, RICHARD FOSTER, a citizen of the United States, residing at Newcastle, in the county of Lawrence and State of Pennsylvania, have invented a new and useful Improvement in Rotary Engines, of which improvement the following is a specification.

This invention relates to certain new and useful improvements in rotary engines, and has for its object to provide a rotary engine that may be operated by steam or any other motive power.

The present invention has for its further object to construct a rotary engine that will have less operative parts than other engines of this class; furthermore, to provide a machine wherein the friction will be reduced to a minimum.

Another object of this invention is to produce a rotary engine that may be easily reversed and will operate in one direction as well as in the opposite direction.

The invention also aims to provide an engine that will be extremely simple in construction, strong, durable, comparatively inexpensive to manufacture, and highly efficient in its use; furthermore, one from which a greater amount of power can be obtained with comparatively little motive force.

The invention further contemplates to construct a rotary engine that will be perfectly balanced and one that will operate with the greatest ease.

In describing the invention in detail, reference is had to the accompanying drawings, forming a part of this specification, and wherein like numerals of reference indicate like parts throughout the several views, in which—

Figure 1:
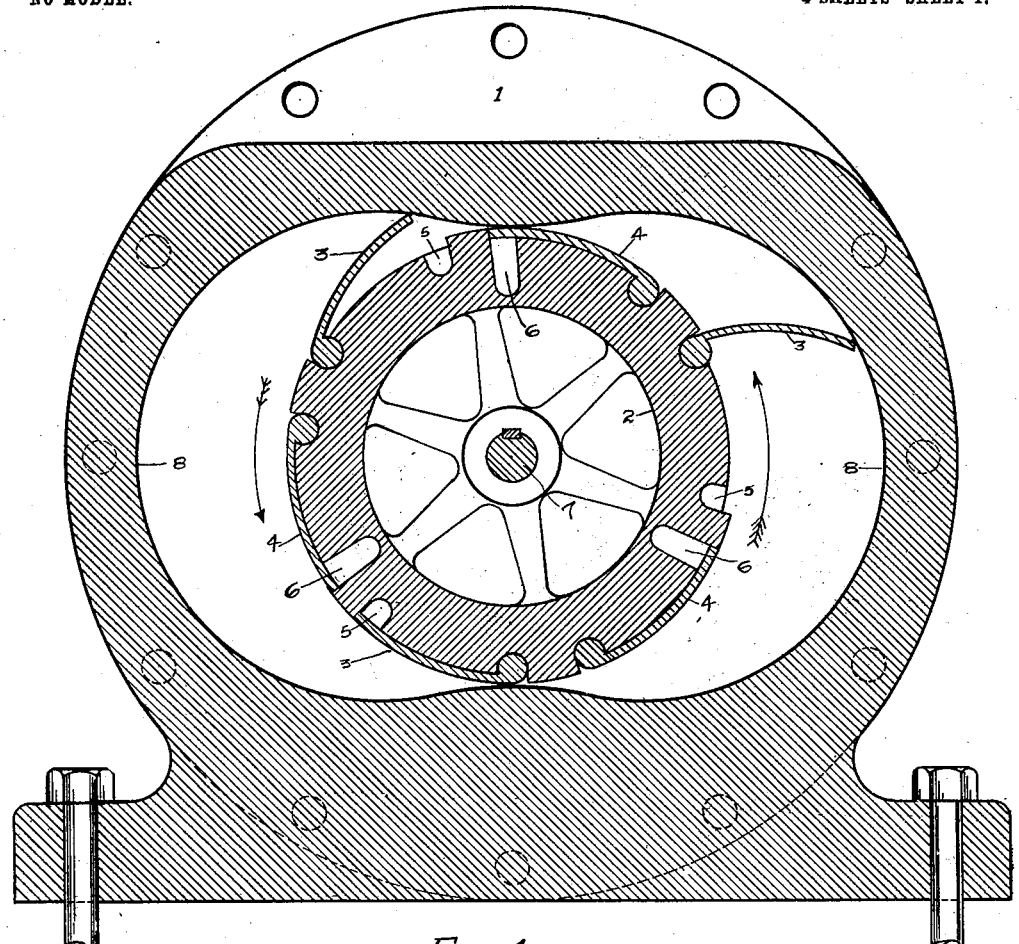
Figure 2:
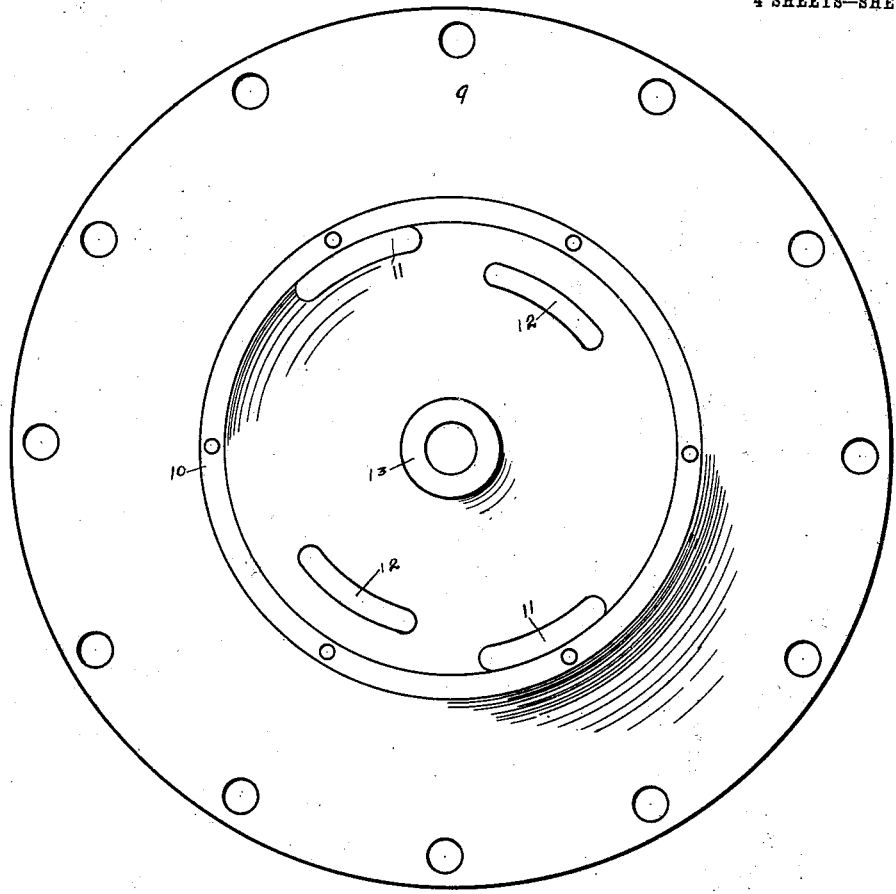
Figure 3:
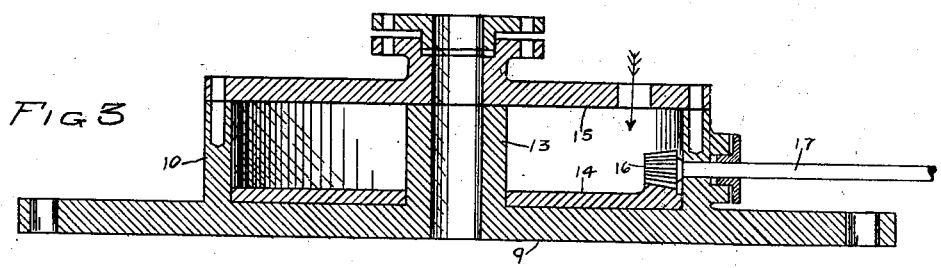
Figure 4:
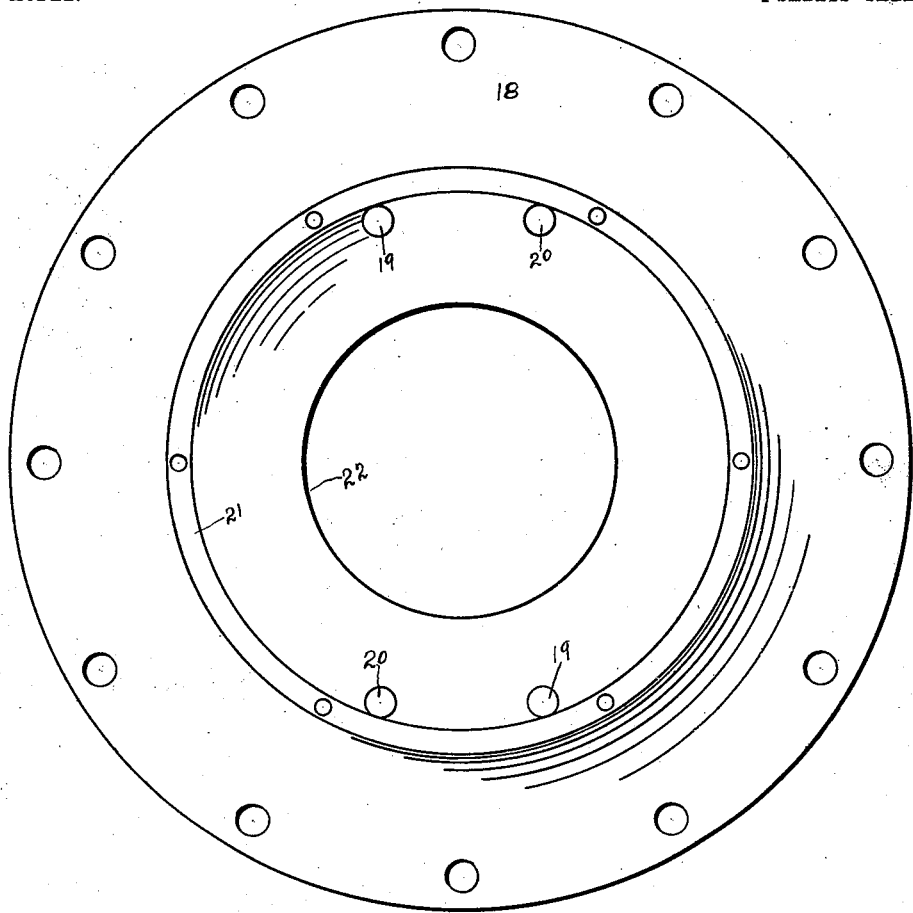
Figure 5:
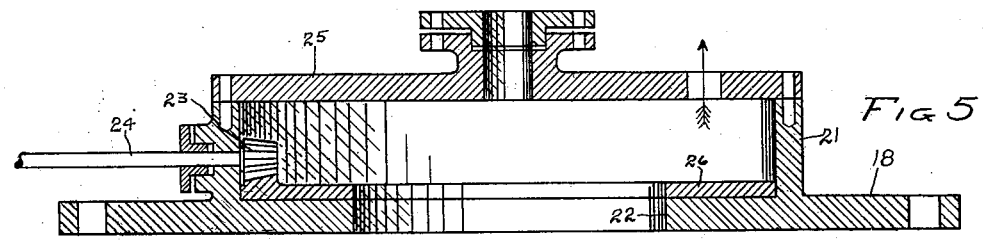
Figure 6:
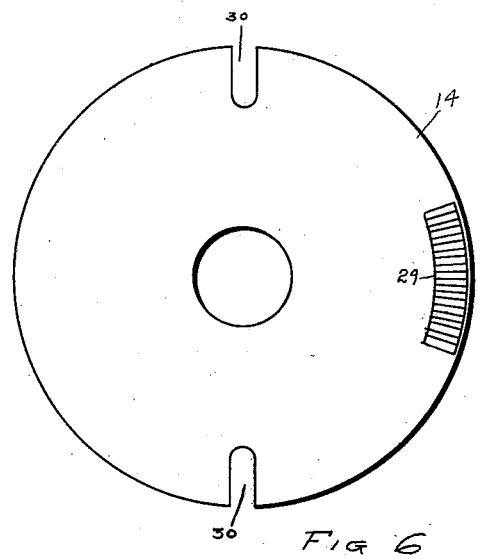
Figure 7:
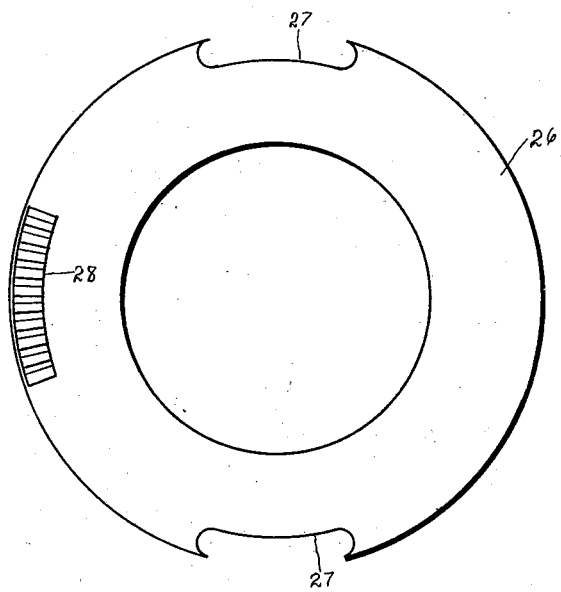

Figure 1 is a sectional view of the end of the engine, with the cylindrical head and steam-chest removed therefrom. Fig. 2 is a front elevation of the cylinder-head. Fig. 3 is a vertical sectional view of the steam-chest and head. Fig. 4 is a front elevation of the cylinder-head, showing the exhaust end of the cylinder. Fig. 5 is a sectional view of the exhaust-steam chest. Fig. 6 is a front view of the steam disk or valve. Fig. 7 is a front elevation of the exhaust-valve.

In Fig. 1 the numeral 3 represents steam-leaves working in a direction to left, one leaf just opening, one on expansion, and one just closed. 4 indicates the leaves closed which would operate the piston in turning to the right. 5 represents the steam-port under leaf 3, and 6 indicates steam-port under leaf 4 and in the reverse of the port 5. 7 indicates a shaft, and 8 shows steam-space for leaves to open and receive the impulse of motive force. It is obvious that this engine has no dead-center and that it will start from any point, as there are just two ports open at a time and three leaves to receive the impulse.

In Fig. 2, 9 indicates part of the head outside of raised steam-chest. 10 indicates a steam-chest. The numeral 11 indicates steam-ports opening to ports in piston, (marked 5.) 12 indicates steam-ports corresponding with ports 6 in piston, and 13 indicates a raised boss to same height as steam-chest, so as to receive cap, thus making a perfectly tight steam-chest, which is more fully shown in sectional view of steam-chest and head in Fig. 2 and is presented in Fig. 3, showing cap in place, also steam-entrance. The section of steam disk or valve is also shown. 9 is a cylinder-head. The numeral 10 indicates the raised edge of steam-chest. 13 indicates a raised boss, 14 represents a steam disk or valve, and 15 indicates the cap of the steam-chest; 16, bevel spur, gearing showing the operation of steam disk or valve used to control the operation of disk or valve. Number 17 represents a spur-wheel shaft connected to spur-wheel shaft on opposite end of engine or exhaust end. (Shown in Fig. 5, numeral 24.)

In Fig. 4, 18 indicates the outside of said head, and 19 represents the exhaust ports or openings into steam-space outside the radius of piston when the piston is running in one direction. 20 indicates openings into steam-space and outside of radius of piston for running in the other direction. The numeral 21 represents the exhaust-chamber, and 22 indicates an opening through the center of the head.

In Fig. 5, 18 is a cylinder-head; 21, elevation of exhaust-chamber; 22, open cut through head; 23, bevel spur-gear; 24, shaft connected to shaft 17 in Fig. 3; 25, a steam-box cap showing exit of steam.

In Fig. 6, 14 is the circle of valve; 29, a gear to operate valve by bevel-wheel 16.

In Fig. 7, 27 is circle of valve. 28 is cog-gear to operate valve or disk by spur-wheel 23. 27 is port connecting with numbers 19 and 20, as is required. This valve or disk is held to place against the face of opening in head by set-screws through cover. (Not shown in the drawings.)

It will be seen that by the above construction of rotary engine as the leaves or wings are rotated every alternate leaf is placed in operation, and when the engine is reversed the leaves that lie normally against the turbine will be placed in operation as the engine travels in the reverse direction.

The many advantages obtained by the use of my invention will be readily apparent from the foregoing dscription, taken in connection with the accompanying drawings.

It will be noted that various changes may be made in the details of construction without departing from the general spirit of my invention.

It will be particularly noted that this engine can be transformed into a compound-engine by using the exhaust-chamber of the first engine for the steam-chest of the second engine, and so on, and it will be noted that as the engine is in operation the steam-pressure exerted on the leaves in motion will act on the outside of the leaves not in motion to keep them in place.

Having fully described my invention, what I claim as new, and desire to secure by Letters Patent, is—

In a rotary engine, the combination of a casing, inlet and exhaust ports formed in the casing, a steam-chest, an inner turbine, wings hinged at one of their ends to the said turbine, steam-ports arranged in the turbine beneath the said wings, said ports extending inwardly at different depths and adapted to register with the ports in the casing, a disk valve rotatively mounted in the steam-chest and having steam-ports formed therein, said ports arranged so as to admit steam into only certain of the steam-ports of the turbine at one time, and means for rotating said disk valve, substantially as and for the purpose specified.

In testimony whereof I have hereunto signed my name in the presence of two subscribing witnesses.

RICHARD FOSTER.

In presence of—
C. W. FENTON,
A. C. HEZLEP.